United States Patent
Lee et al.

(10) Patent No.: US 7,312,991 B2
(45) Date of Patent: Dec. 25, 2007

(54) ELECTRONIC APPARATUS HAVING A VIBRATION ABSORBER

(75) Inventors: Ko-Hsien Lee, Fongshan (TW);
Shu-Mei Chien, Bade (TW);
Jian-Ming Lee, Linkou Township, Taipei County (TW)

(73) Assignee: Benq Corporation, Taoyuan (TW)

( * ) Notice: Subject to any disclaimer, the term of this patent is extended or adjusted under 35 U.S.C. 154(b) by 275 days.

(21) Appl. No.: 11/175,458

(22) Filed: Jul. 5, 2005

(65) Prior Publication Data

US 2006/0002071 A1    Jan. 5, 2006

(30) Foreign Application Priority Data

Jul. 5, 2004    (TW) .................. 93120116 A

(51) Int. Cl.
*H05K 7/20* (2006.01)
*F01D 25/26* (2006.01)

(52) U.S. Cl. ..................... 361/695; 415/213.1
(58) Field of Classification Search ............. None
See application file for complete search history.

(56) References Cited

U.S. PATENT DOCUMENTS

| | | | | |
|---|---|---|---|---|
| 4,008,942 A | * | 2/1977 | Grossi | 439/328 |
| 4,482,124 A | * | 11/1984 | Dochterman | 248/604 |
| 4,568,243 A | * | 2/1986 | Schubert et al. | 415/213.1 |
| 4,790,863 A | * | 12/1988 | Nobiraki et al. | 96/384 |
| 5,208,730 A | * | 5/1993 | Tracy | 361/687 |
| 5,407,324 A | * | 4/1995 | Starnes et al. | 415/208.5 |
| 6,745,149 B2 | * | 6/2004 | Beeten | 702/132 |
| 7,186,075 B2 | * | 3/2007 | Winkler et al. | 415/119 |
| 7,189,053 B2 | * | 3/2007 | Winkler et al. | 415/108 |
| 2006/0216147 A1 | * | 9/2006 | Park | 415/220 |
| 2007/0051576 A1 | * | 3/2007 | Shimoda et al. | 188/380 |

FOREIGN PATENT DOCUMENTS

| | | |
|---|---|---|
| CN | 2590057 Y | 12/2003 |
| CN | 2625958 Y | 7/2004 |

OTHER PUBLICATIONS

Chinese Office Action dated Jun. 8, 2007 from a corresponding foreign application.

* cited by examiner

*Primary Examiner*—Boris Chervinsky
(74) *Attorney, Agent, or Firm*—Snell & Wilmer L.L.P.

(57) ABSTRACT

An optical access apparatus is provided. The optical access apparatus includes a mounting plate, characterized in that the mounting plate has a bent portion acting as a balance plate of the optical access apparatus.

17 Claims, 4 Drawing Sheets

ELECTRONIC APPARATUS HAVING A VIBRATION ABSORBER

CROSS REFERENCE TO RELATED APPLICATIONS

This Application claims the right of priority based on Taiwan Patent Application No. 93120116 entitled "AN ELECTRONIC APPARATUS HAVING A SHOCK ABSORBER" filed on Jul. 5, 2004, which is incorporated herein by reference.

FIELD OF THE INVENTION

The present invention relates to an electronic apparatus having a vibration absorber, and more particularly, to a vibration absorber having a plurality of deformation spaces.

BACKGROUND OF THE INVENTION

Mechanical vibrations are commonly generated from the electronic components in most electronic apparatuses, for example, computers or projectors with cooling fans, or recorder players, CD players or DVD players having motors used to rotate tapes or spin disks. Those undesirable mechanical vibrations propagating within the apparatuses generally turn into the sources of noises. Some of the vibrations become the electronic noises interfering with the intended operations of the apparatuses while some others are converted into undesirable sounds that make the users annoyed.

In order to weaken undesirable mechanical vibrations, the electronic devices are conventionally wrapped or padded with elastic materials, such as rubbers or corks, to absorb some of the vibrations and convert them into heat. However, such a traditional approach has gradually lost its advantages, as the trend of reducing size in electronic devices is ongoing. The smaller the electronic devices are, the more sensitive to any slight vibrations they become. Accordingly, there is a need to provide a more advantageous technology for reducing such vibrations effectively so as to fabricate more desirable electronic apparatuses.

SUMMARY OF THE INVENTION

The present invention provides an electronic apparatus including a housing, an electronic device generating vibrations during operations, and a vibration absorber. The vibration absorber, having a cavity and a plurality of deformation spaces, is positioned in the housing, wherein the cavity is inserted with the electronic device so as to reduce the vibrations and prevent the housing from the vibrations.

DETAILED DESCRIPTION

Figure 1:
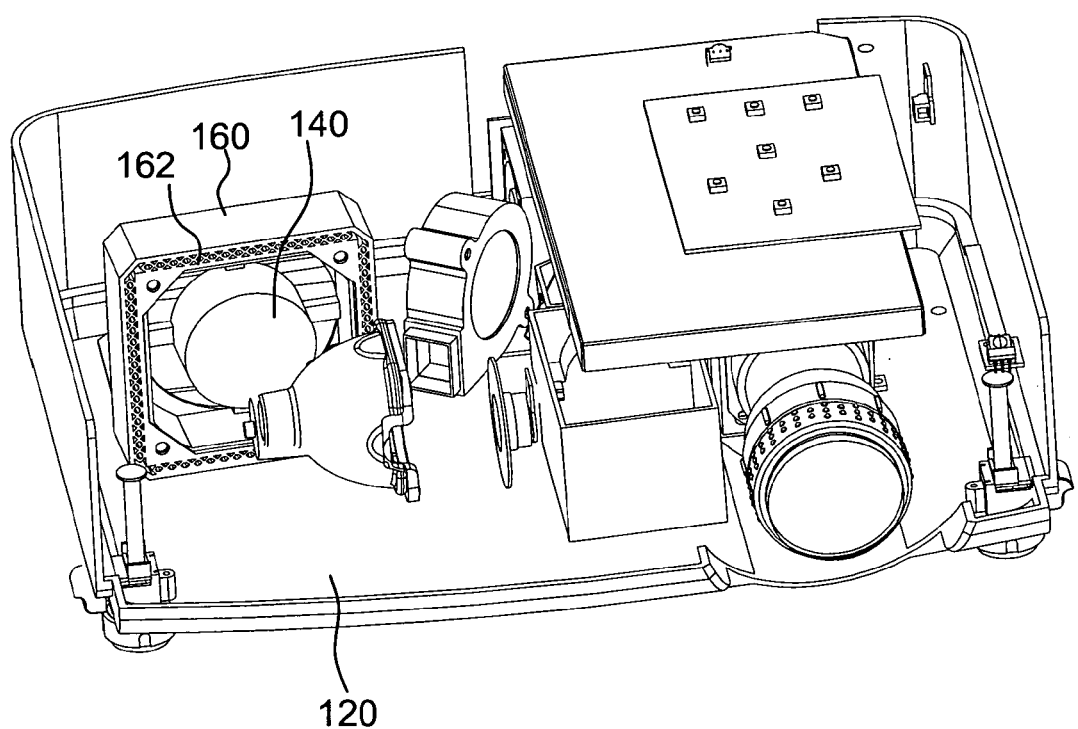
FIG. 1 shows an internal structure of an electronic apparatus in accordance with the present invention.

In accordance with the present invention, the electronic apparatus and the electronic device are respectively described and illustrated by way of a projector and a cooling fan, resulted from certain of the preferred embodiments. As shown in FIG. 1, the projector 100 includes a housing 120, a vibration absorber 160 positioned in the housing 120, and a cooling fan 140 embedded into the vibration absorber 160.

Figure 2A:
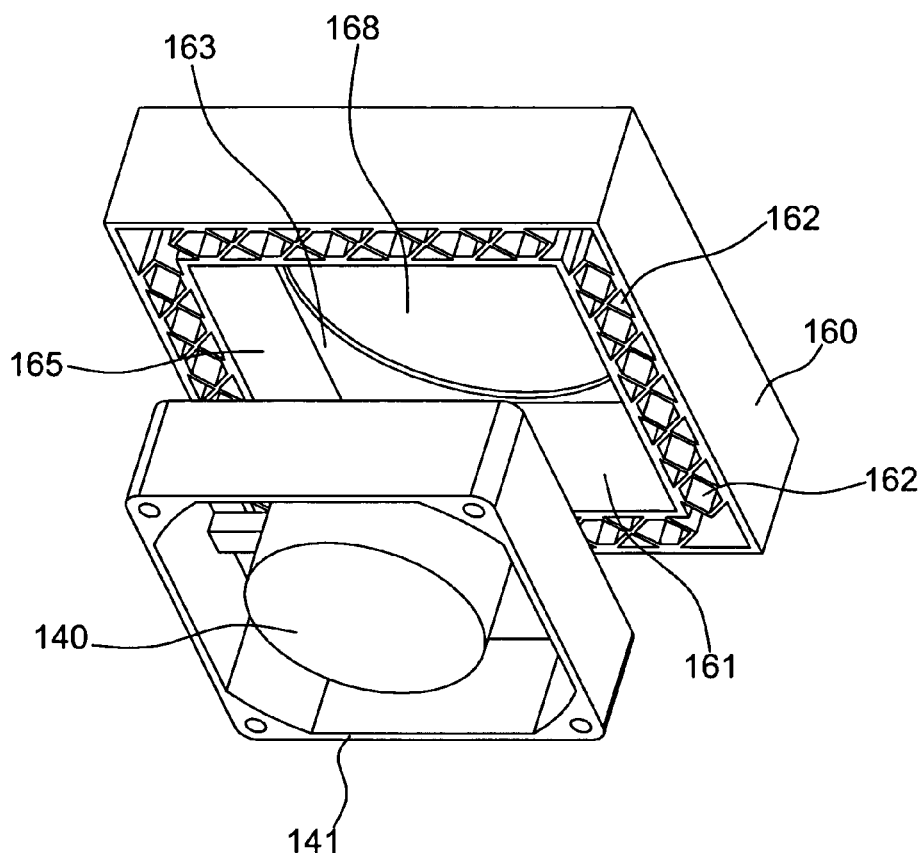
FIG. 2A shows a vibration absorber and a cooling fan before assembling in accordance with the present invention.
Figure 2B:
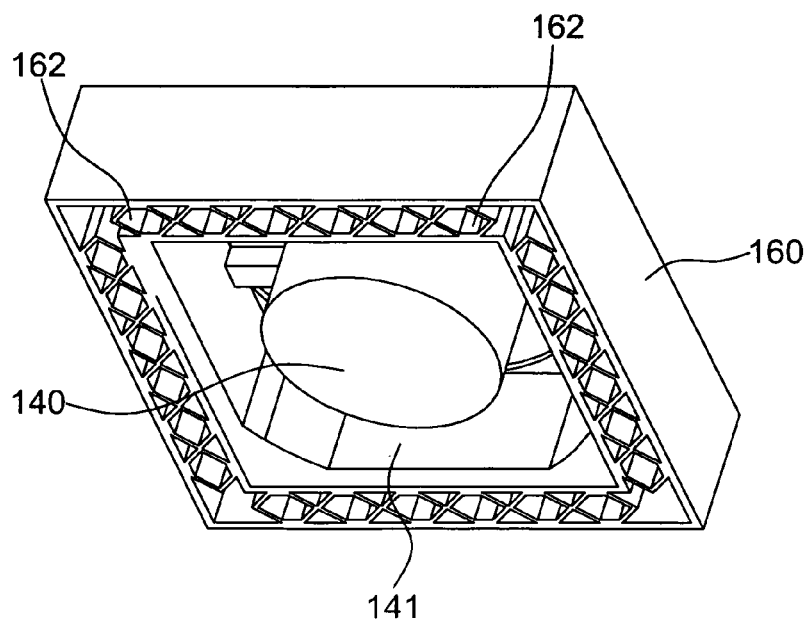
FIG. 2B shows a vibration absorber assembled with a cooling fan in accordance with the present invention.

As shown in FIGS. 2A-2B, the vibration absorber 160 includes a cavity 161 formed for fitting the contour 141 of the cooling fan 140 inserted thereinto. The vibration absorber 160 is made of elastic materials such as silicon rubber, polyurethane, and poly vinyl chloride etc., in which the silicon rubber exhibiting hardness of greater than 35 Shore is preferred. However, because merely using the elastic materials for absorbing vibrations is insufficient as the above described, the vibration absorber 160 of the present invention additionally provides a plurality of deformation spaces 162 in order to reduce the vibrations effectively and prevent the housing 120 from them as well as keeping other devices, also connected with the housing 120 in the electronic apparatus, unaffected thereby. The vibration absorber 160 specifically includes a blocking device 163 formed on the bottom portion of the cavity 161, used to avoid the cooling fan 140 from disengaging the vibration absorber 160 during operations. The blocking device 163 further includes an air outlet 168 for discharging air through the cooling fan 140.

Figure 3:
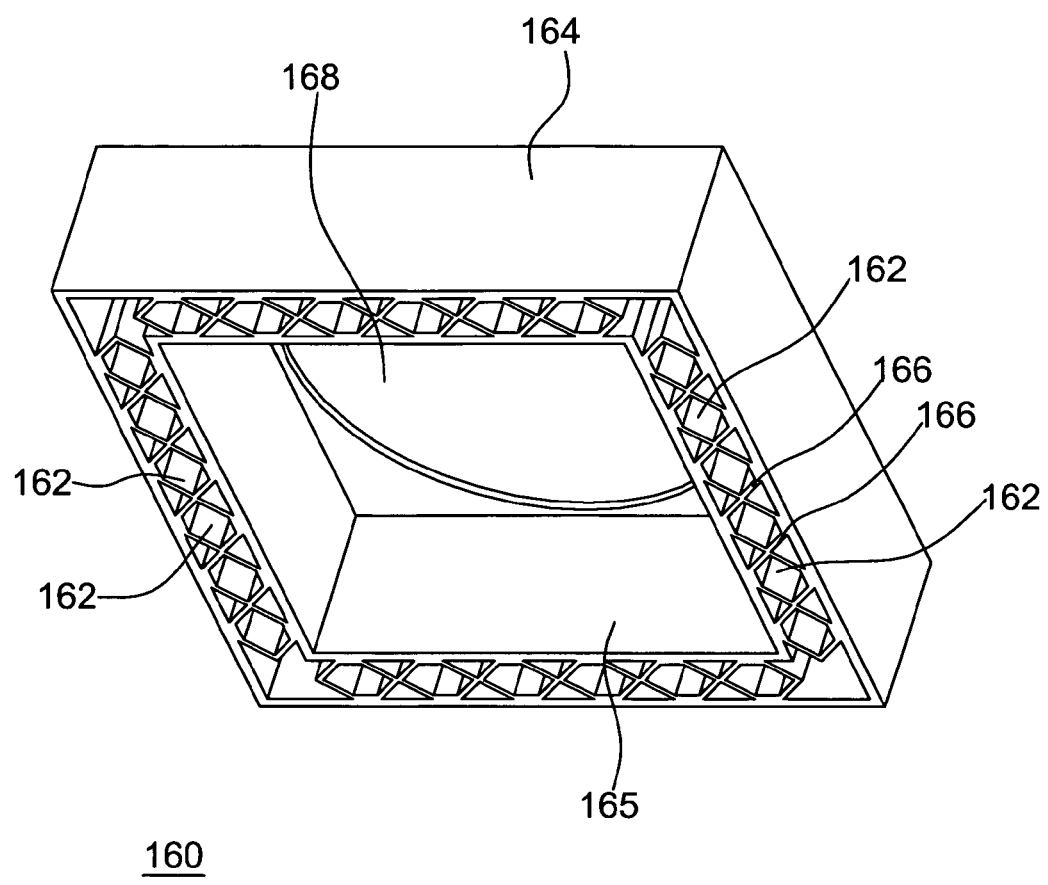
FIG. 3 perspectively shows a vibration absorber in accordance with the present invention.

The plurality of deformation spaces 162 are particularly described as below. As shown in FIG. 3, the vibration absorber 160 has a outer layer 164, an inner layer 165 (i.e. the wall of the cavity 161), and a plurality of linking slices 166, wherein each of the plurality of linking slices 166 is crossed to each other and connected with the outer layer 164 and the inner layer 165, so as to create a plurality of deformation spaces 162 between the outer layer 164 and the inner layer 165.

Figure 4A:
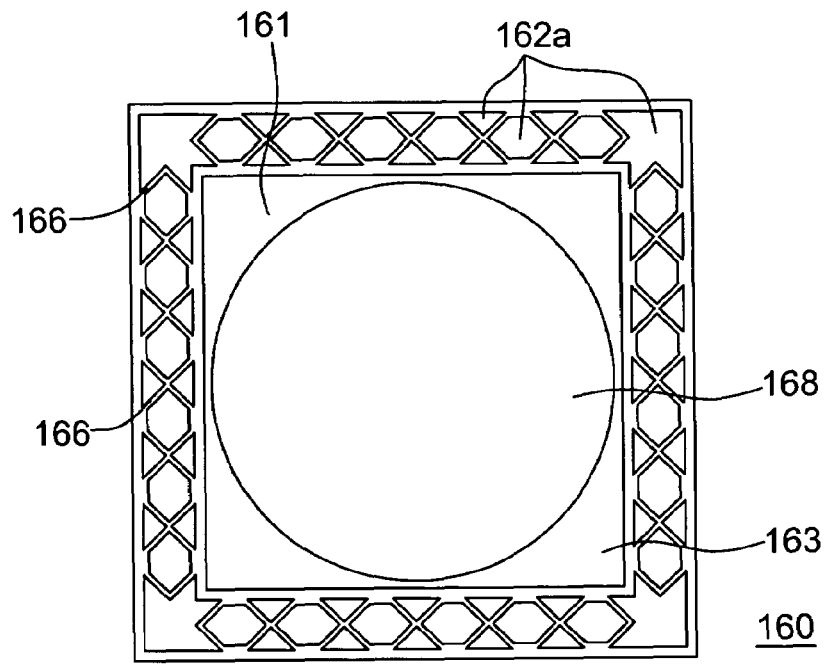
FIGS. 4A and 4B show a vibration absorber in front and rear views respectively in accordance with the present invention.
Figure 4B:
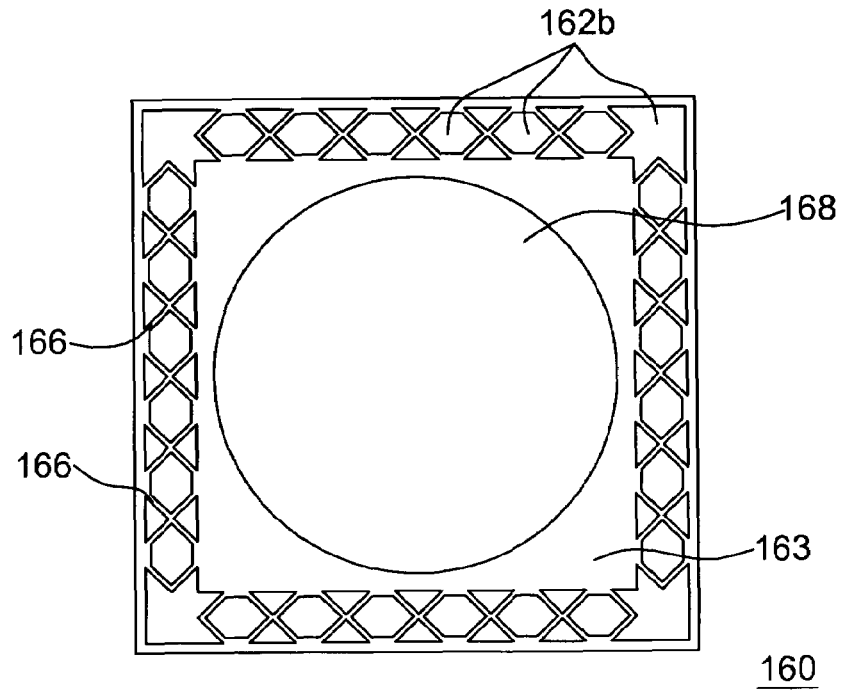

FIGS. 4A and 4B showing the vibration absorber 160 in a front and rear views respectively according to one embodiment of the present invention are intended to demonstrate that, each deformation space 162 is an open-ended channel, i.e. each opening of the deformation space 162a in FIG. 4A has its corresponding opening of the same deformation space 162b as indicated in FIG. 4B. Furthermore, the openings 162a/162b are polygonal-shaped and distributed in the vibration absorber 160 to form a net configuration, thereby creating a firm structure for holding the electronic device (i.e. the cooling fan 140) as well as absorbing vibrations effectively.

The present invention has been described above with reference to preferred embodiments. However, those skilled in the art can understand that the scope of the present invention need not be limited to the disclosed preferred embodiments. On the contrary, it is intended to cover various modifications and equivalent arrangements within the scope defined in the following appended claims. The scope of the claims should be accorded the broadest interpretation so as to encompass all such modifications and equivalent arrangements.

What is claimed is:

1. An electronic apparatus, comprising:
   a housing;
   an electronic device generating vibrations during operations; and
   a vibration absorber, positioned in said housing, comprising:

a cavity for receiving said electronic device;
an outer layer;
an inner layer defining said cavity; and
a plurality of linking slices, each linking slice being connected with said outer layer and said inner layer to form a plurality of deformation spaces;
wherein said cavity is formed for fitting the contour of said electronic device embedded therein so as to reduce said vibrations.

2. The electronic apparatus of claim 1, wherein each of said plurality linking slices is cross to each other.

3. The electronic apparatus of claim 1, wherein said plurality of deformation spaces are in the form of a plurality of open-ended channels, each of said plurality of open-ended channels has at least one opening.

4. The electronic apparatus of claim 3, wherein the openings of said plurality of open-ended channels are distributed in said vibration absorber to form a net configuration.

5. The electronic apparatus of claim 3, wherein the openings of said plurality of open-ended channels are polygonal-shaped.

6. The electronic apparatus of claim 1, wherein said electronic device includes a cooling fan.

7. The electronic apparatus of claim 1, wherein said vibration absorber includes a blocking device positioned on the bottom portion of said cavity to prevent said electronic device from disengaging said vibration absorber.

8. The electronic apparatus of claim 6, wherein said vibration absorber further includes an air outlet for discharging air through said cooling fan.

9. The electronic apparatus of claim 1, wherein said vibration absorber is made of an elastic material with hardness of greater than 35 Shore.

10. An electronic apparatus, comprising:
a housing;
an electronic device generating vibrations during operations; and
a vibration absorber, positioned in said housing, having a cavity for receiving said electronic device, an outer layer, an inner layer defining said cavity, and a plurality of linking slices, in which each of said plurality linking slices being cross to each other and being connected with said outer layer and said inner layer to form a plurality of deformation spaces;
wherein said cavity is formed for fitting the contour of said electronic device embedded therein so as to reduce said vibrations.

11. The electronic apparatus of claim 10, wherein said plurality of deformation spaces are in the form of a plurality of open-ended channels, each of said plurality of open-ended channels has a least one opening.

12. The electronic apparatus of claim 11, wherein the openings of said plurality of open-ended channels are distributed in said vibration absorber to form a net configuration.

13. The electronic apparatus of claim 11, wherein the openings of said plurality of open-ended channels are polygonal-shaped.

14. The electronic apparatus of claim 10, wherein said electronic device includes a cooling fan.

15. The electronic apparatus of claim 10, wherein said vibration absorber includes a blocking device positioned on the bottom of said cavity to prevent said electronic device from disengaging said vibration absorber.

16. The electronic apparatus of claim 14, wherein said vibration absorber further includes an air outlet for discharging air through said cooling fan.

17. The electronic apparatus of claim 10, wherein said vibration absorber is made of an elastic material with hardness of greater than 35 Shore.

* * * * *